No. 621,976. Patented Mar. 28, 1899.
L. G. ROWAND.
OVERLOAD SAFETY DEVICE FOR ELECTRIC CIRCUITS.
(Application filed Dec. 24, 1897.)
(No Model.) 2 Sheets—Sheet 1.
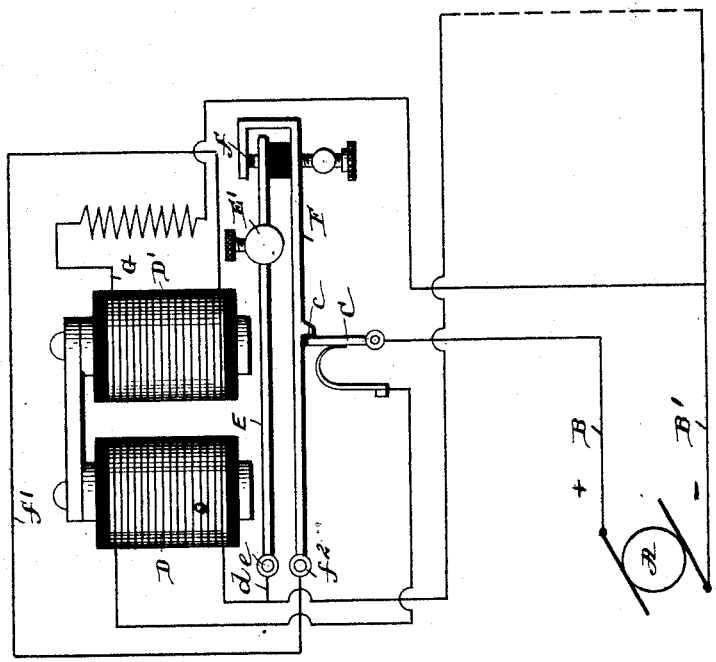
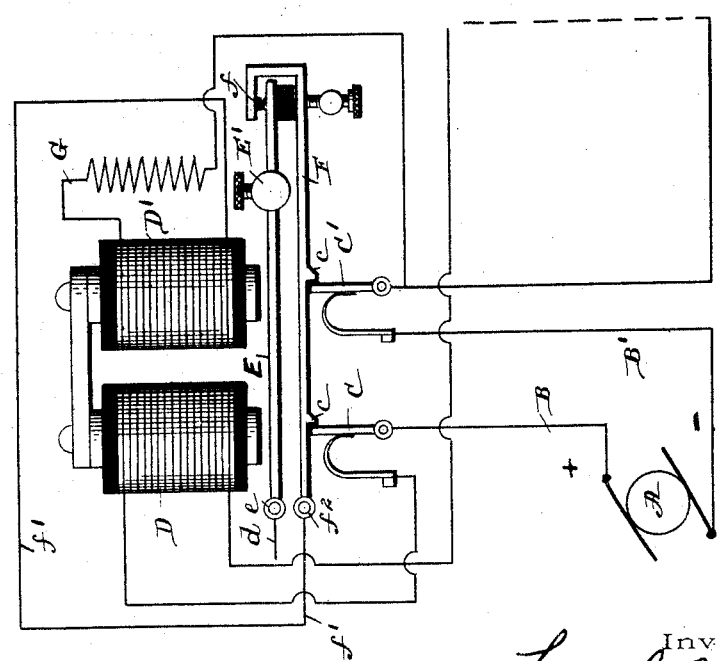
Witnesses.
Jesse B. Heller
Frances Ellis
Inventor.
Lewis G. Rowand
by Harding & Harding
Attorneys No. 621,976. Patented Mar. 28, 1899.
L. G. ROWAND.
OVERLOAD SAFETY DEVICE FOR ELECTRIC CIRCUITS.
(Application filed Dec. 24, 1897.)
(No Model.) 2 Sheets—Sheet 2.
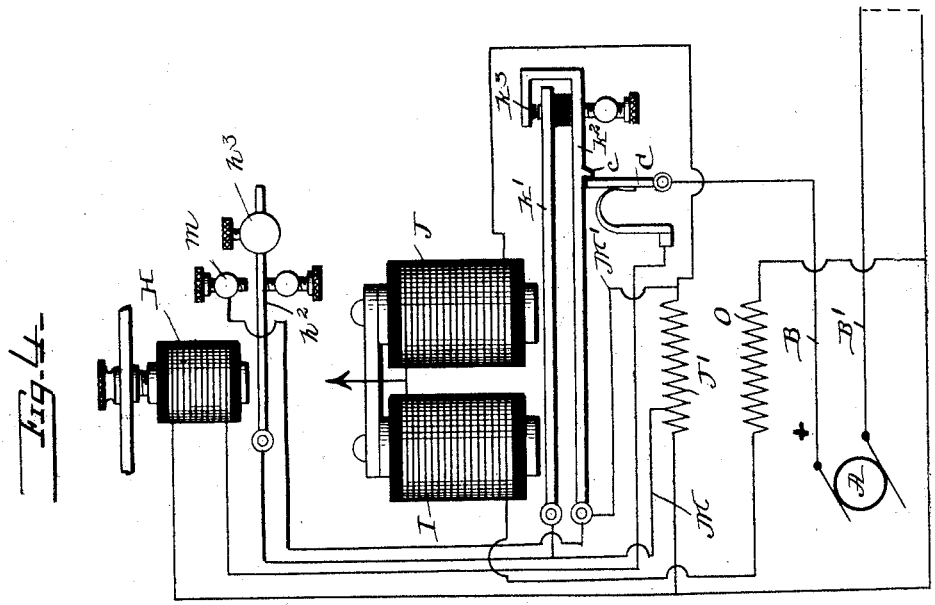
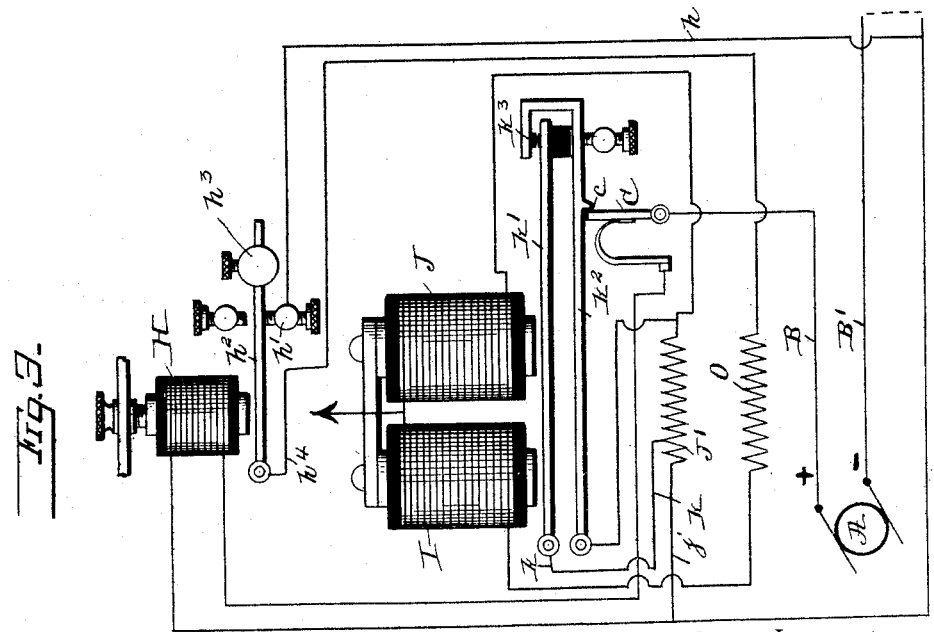
Witnesses. Inventor.

UNITED STATES PATENT OFFICE.

LEWIS G. ROWAND, OF CAMDEN, NEW JERSEY, ASSIGNOR TO THE UNIVERSAL FIRE ALARM COMPANY, OF NEW JERSEY.

OVERLOAD SAFETY DEVICE FOR ELECTRIC CIRCUITS.

SPECIFICATION forming part of Letters Patent No. 621,976, dated March 28, 1899.

Application filed December 24, 1897. Serial No. 663,310. (No model.)

*To all whom it may concern:*

Be it known that I, LEWIS G. ROWAND, a citizen of the United States, residing at Camden, county of Camden, and State of New Jersey, have invented a new and useful Improvement in Overload Safety Devices for Electric Circuits, of which the following is a full, clear, and exact description, reference being had to the accompanying drawings, which form a part of this specification.

The usual construction of overload circuit protectors is placed in series with the circuit, an electric device, such as an electromagnet, and through the armature of this magnet controlling a switch. Either the core of the magnet is made adjustable or its armature is provided with resistance, such as a weight or spring, to make it active only when the current quantity or amperage has reached the limit set for it. The trouble with such construction is that the amperage of the current may rise gradually and pass considerably beyond the limit before the device or armature moves sufficiently to affect the switch, and unless the increase in amperage of the current be sudden the action is often defective.

The object of my invention is to operate the switch with certainty the instant the amperage of the current of the circuit passes beyond the limit designed.

To that end, speaking generally, my invention consists in placing an electrical device in series with the circuit and an electric device in shunt with the circuit, the movable member of the series electrical device controlling the shunt electrical device and either the movable member of shunt electric device alone or the movable members of the series and shunt devices controlling a switch on the circuit.

I will now describe the invention as illustrated in the drawings, in which—

Figures 1, 2, 3, and 4 are views showing different constructions of my overload switch.

Speaking first of Figs. 1 and 2, A is the source of current-supply, B the wire from the positive source of current-supply, and B' the wire from the negative source of current-supply. C C' are the switches on the positive and negative wires, Fig. 1. D is a magnet included and in series with the circuit formed by the wires B B'. A wire $d$ connects the armature E, pivoted at $e$ with the wire B. Upon this armature is weight E', which may be moved upon the armature. $f$ is a contact in connection with the arm F, which arm F is pivoted at $f^2$ and connected to the wire $f'$, leading to the magnet D'. A wire G from the magnet D' leads to the wire B', so that the magnet D' is in a normally open shunt with the main circuit formed by the wires B B'. The arm F has the insulated stops $c$, against which in the position shown in the drawings the switches C and C' are locked.

The wiring and construction of the parts in Fig. 2 are substantially the same as that in Fig. 1, with the exception that instead of having a switch upon both the positive wire B and the negative wire B' a switch C is placed upon the negative wire only.

In the operation of this device, as shown in Figs. 1 and 2, the weight E' is placed so as to give the armature E a resistance, so as to prevent the magnet D acting until the amperage reaches the desired limit. The moment the magnet D attracts the armature E the slightest contact is made between the armature and the contact $f$, which at once closes the shunt-circuit to the magnet D', and the magnets D and D' act together upon the armature, lifting it and the arm F and releasing the stops $c\ c$, and the switches open in Fig. 1 and the switch opens in Fig 2. As may be seen from this construction, instead of the series magnet D alone operating the armature to release the switches the moment the magnet D becomes active to affect the armature its action is at once reinforced by the armature D', so that the throw of the armature to release the switches is at once made certain and rapid.

In Figs. 3 and 4 I have shown another form of embodiment of my invention, in which a magnet in series with the circuit is used merely for controlling the current to a secondary magnet in shunt, which secondary magnet in shunt affects the switch operation.

Speaking first of Fig. 3, A, as before, represents the generator, and B and B' the plus and minus wires from the generator. The magnet H is in series with the circuit formed by the wires B B', and C is, as before, a switch on the wire B. From the wire B' a wire $h$ leads to a contact $h'$, normally in contact with the armature $h^2$, the armature having upon it the adjustable weight $h^3$. This armature is controlled by the magnet H. From the armature $h^2$ a wire $h^4$ extends through resistances O to the magnet I, and from the magnet I a wire extends to ground. From the wire B a wire $j$ leads through resistances J' to the magnet J and from the magnet J to ground, the windings upon the magnets I and J being in opposite directions. From the wire $j$ a wire $k$ leads to the armature $k'$, and from the pivoted arm $k^2$ a wire leads back again to wire $j$, these two wires being so arranged with reference to the wire $j$ that they form a loop around the resistance J' in the circuit to the magnet J. Upon the arm $k^2$ is a contact-point $k^3$ in line of movement of the armature $k'$. Under the conditions shown in the drawings the magnets I and J are neutralized on account of the current passing in opposite directions through said magnets. When the magnet H operates upon the armature $h^2$, it lifts the armature so as to move it from the contact $h'$ and opens the circuit to the magnet I. As a consequence the magnet J at once becomes effective and lifts the armature $k'$ into contact with the contact $k^3$, thereby creating a circuit to the magnet J around the resistances J' and the magnet J at once lifts the armature K' and the arm K$^2$, releasing the stop $c$ from the switch C, and the switch is opened.

Of course it is obvious that instead of using two magnets I and J a single magnet could be used and that magnet could act directly to lift the armature and release the switch without throwing in the circuit around the resistance. In fact, the wire $j$ might in that case lead directly to the magnet J without passing through resistances.

In Fig. 4, as in Fig. 3, the magnet H is in series with the circuit formed by the wires B B' and the magnets I and J are in shunt with said circuit, the shunt-circuits to the magnet passing through resistances. In this construction a wire M passes from one side of the resistance to the armature $h^2$ of the magnet H, and from the other side of the resistance J' a wire M' passes to the pivoted arm $k^2$, and from the pivoted arm $k^2$ a wire passes to the contact $m$, normally out of engagement with the armature $h^2$. Under ordinary conditions in this figure, as in Fig. 3, the magnets I and J, being oppositely wound, would be ineffective upon the armature. When the magnet H effects the armature H$^2$, it will bring it in contact with the contact $m$ and close the circuit to the magnet J around the resistance J', and as a consequence the magnet J will become effective and lift the armature $k'$ and the arm $k^2$, moving the stop $c$ and releasing the switch C. In this case, as in the description of the previous figure, a single magnet J might be used in place of the magnets I and J.

In all the constructions shown in the figures before described, as may be seen, the magnet in series does not by itself control the switch-releasing mechanism, but in all cases controls it through the medium of the secondary magnet. This secondary magnet may act alone or in conjunction with the series magnet. The value of this construction is that the operation upon the switch is very certain. The amount of lift to the armature of the series magnet in order to cause it either to make or break the contact is very slight; but this slight action at once throws a short circuit through a secondary magnet, causing it to act with great intensity, and this last magnet, either alone or in conjunction with the series magnet, operates the armature to release the switch, so that the switch is operated with absolute certainty the moment the amperage exceeds the desired amount.

I do not intend to limit myself to the particular embodiments of my invention shown in the drawings, as it is evident that the precise construction may be varied considerably, the essential feature being that the shunt electric device is controlled by the movable member of the series electric device and the switch is controlled by the movable member of the shunt device either alone or in conjunction with the movable member of the series electrical device. Nor do I intend to limit myself to the particular form of electric device having a movable member—to wit, an electromagnet—as other electrical devices having movable members may be used—such, for instance, as a solenoid.

Having now fully described my invention, what I claim, and desire to protect by Letters Patent, is—

1. An overload safety device for an electric circuit, consisting essentially of an electric device, in series with the circuit, having a movable member, said electric device being normally inactive, an electric device, in shunt with the circuit, having a movable member, a switch upon the main circuit controlled in whole or in part by the movable member of the shunt electric device, the shunt electric device being controlled by the movable member of the series electrical device and adapted to become active when the series electric device becomes active.

2. An overload safety device for an electric circuit, consisting essentially of an electric device, in series with the circuit, having a movable member, an electrical device, in shunt with the circuit, having a movable member, the movable member of the series electric device controlling the shunt electric device, and a switch upon the main circuit controlled by the movable members of the shunt and series electrical devices.

In testimony of which invention I have hereunto set my hand.

LEWIS G. ROWAND.

Witnesses:
 FRANK S. BUSSER,
 FRANCES ELLIS.